(12) United States Patent
Zhang et al.

(10) Patent No.: US 12,393,243 B2
(45) Date of Patent: Aug. 19, 2025

(54) SUPERCOMPUTING DEVICE, IN-PLACE DETECTION METHOD FOR COMPUTING POWER BOARD, AND STORAGE MEDIUM

(71) Applicant: Bitmain Technologies Inc., Beijing (CN)

(72) Inventors: Shuhao Zhang, Beijing (CN); Tao Yang, Beijing (CN)

(73) Assignee: Bitmain Technologies Inc., Beijing (CN)

( * ) Notice: Subject to any disclaimer, the term of this patent is extended or adjusted under 35 U.S.C. 154(b) by 154 days.

(21) Appl. No.: 18/565,458

(22) PCT Filed: May 16, 2022

(86) PCT No.: PCT/CN2022/093112
§ 371 (c)(1),
(2) Date: Nov. 29, 2023

(87) PCT Pub. No.: WO2022/252973
PCT Pub. Date: Dec. 8, 2022

(65) Prior Publication Data
US 2024/0370069 A1    Nov. 7, 2024

(30) Foreign Application Priority Data

May 31, 2021 (CN) .......................... 202110605596.8

(51) Int. Cl.
*G06F 1/26* (2006.01)
*G06F 1/18* (2006.01)
(52) U.S. Cl.
CPC ................ *G06F 1/26* (2013.01); *G06F 1/188* (2013.01)
(58) Field of Classification Search
CPC ................................... G06F 1/26; G06F 1/118
See application file for complete search history.

(56) References Cited

U.S. PATENT DOCUMENTS 11,281,264 B2 * 3/2022 Wu .......................... G06F 1/186
12,222,786 B2 * 2/2025 Lin ...................... G06F 13/4068
2018/0150127 A1 * 5/2018 Wendt ................... G06F 1/3287

FOREIGN PATENT DOCUMENTS

CN       101582548 A       11/2009
CN       103399254 A       11/2013
(Continued)

OTHER PUBLICATIONS

The First Examination Opinion Notice dated Dec. 28, 2024 for Chinese Application No. 202110605596.8.
(Continued)

*Primary Examiner* — Henry Tsai
*Assistant Examiner* — Christopher A Daley

(57) ABSTRACT

A supercomputing device, an in-place detection method for a computing power board, and a storage medium are provided. The supercomputing device includes: at least one computing power board including a first-type signal pin and a second-type signal pin, where the first-type signal pin has a different length from that of the second-type signal pin; a computing power board interface inserted into the computing power board interface; a level detection circuit electrically connected to the computing power board interface; and a master control circuit being connected to the level detection circuit, where the level detection circuit is configured to detect a first level signal corresponding to the first-type signal pin and a second level signal corresponding to the second-type signal pin, and the master control circuit determines in-place information of the computing power board based on the first level signal and the second level signal.

10 Claims, 6 Drawing Sheets

(56) References Cited

FOREIGN PATENT DOCUMENTS

| | | |
|---|---|---|
| CN | 106407146 A | 2/2017 |
| CN | 110825679 A | 2/2020 |
| CN | 112380074 A | 2/2021 |
| CN | 212781148 U | 3/2021 |
| CN | 113220091 A | 8/2021 |
| CN | 215006498 U | 12/2021 |
| JP | H1127620 A | 10/1999 |

OTHER PUBLICATIONS

International Search Report dated Aug. 17, 2022 regarding International Application No. PCT/CN2022/093112.

* cited by examiner

SUPERCOMPUTING DEVICE, IN-PLACE DETECTION METHOD FOR COMPUTING POWER BOARD, AND STORAGE MEDIUM

CROSS-REFERENCE TO RELATED APPLICATION

The present application is a national stage of International Application No. PCT/CN2022/093112, filed on May 16, 2022, which claims the priority to Chinese Patent Application No. 2021106055968, filed with the China National Intellectual Property Administration on May 31, 2021 and entitled "SUPERCOMPUTING DEVICE, IN-PLACE DETECTION METHOD FOR COMPUTING POWER BOARD, AND STORAGE MEDIUM", both of the above application are incorporated herein by reference in their entireties.

TECHNICAL FIELD

The present application relates to the technical field of computer devices, and in particular, to a supercomputing device, an in-place detection method for a computing power board, and a storage medium.

BACKGROUND

With large-scale application of networks and rapid development of server technology, the market demand for cryptocurrency is also increasing exponentially. In order to efficiently obtain cryptocurrency, dedicated hardware is required, such as a miner which usually supports a hot plug function. A core element of the miner is a computing power board, also referred to as a hash board, which includes a circuit and an integrated circuit chip, and performs computation of hash functions.

The computing power board may be connected to the miner by means of hot plug. When the miner detects that the computing power board is inserted, and a logic level of a signal is detected to change from high to low, it is determined that the computing power board is in place; and when the miner detects that the computing power board is pulled out, and a logic level of the signal is detected to change from low to high, it is determined that the computing power board is out of place. However, when the computing power board is subjected to incomplete insertion due to failure to reach a specified position when inserted, a false determination of in-place information of the computing power board is easily made, bringing about potential safety hazards.

SUMMARY

The main objective of the present application is to provide a supercomputing device, an in-place detection method for a computing power board, and a storage medium, which are intended to accurately detect in-place information of the computing power board so as to prevent serious faults.

In a first aspect, the present application provides a supercomputing device. The supercomputing device includes:
  at least one computing power board, the computing power board including a first-type signal pin and a second-type signal pin, where the first-type signal pin has a different length from that of the second-type signal pin;
  a computing power board interface, the computing power board being inserted into the computing power board interface;
  a level detection circuit, the level detection circuit being electrically connected to the computing power board interface; and
  a master control circuit, the master control circuit being connected to the level detection circuit,
  where the level detection circuit is configured to detect a first level signal corresponding to the first-type signal pin and a second level signal corresponding to the second-type signal pin, and the master control circuit determines in-place information of the computing power board based on the first level signal and the second level signal.

In a second aspect, the present application further provides an in-place detection method for a computing power board, where the method is applied to a supercomputing device as described above. The method includes:
  detecting a first level signal corresponding to a first-type signal pin and a second level signal corresponding to a second-type signal pin; and
  determining in-place information of the computing power board based on the first level signal and the second level signal, where the in-place information includes an in-place state, an incompletely inserted state, and an out-of-place state.

In a third aspect, the present application further provides a computer-readable storage medium having a computer program stored thereon, where when the computer program is executed by a processor, the steps of the foregoing in-place detection method are implemented.

The present application provides a supercomputing device, an in-place detection method for a computing power board, and a storage medium. According to the present application, when a computing power board is inserted into a computing power board interface, a level detection circuit detects a first level signal corresponding to a first-type signal pin and a second level signal corresponding to a second-type signal pin, and a master control circuit determines in-place information of the computing power board based on the first level signal and the second level signal. The first-type signal pin has a different length from that of the second-type signal pin, allowing for more accurate detection of the in-place information of the computing power board, particularly accurate detection of whether the computing power board is in the incompletely inserted state, with a high reliability, and thus preventing major faults from occurring due to incomplete insertion of the computing power board.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art may derive other drawings from these accompanying drawings without creative efforts.

The implementation of the objective, functional characteristics, and advantages of the present application will be further described with reference to the accompanying drawings in combination with embodiments.

DESCRIPTION OF EMBODIMENTS

The following clearly and completely describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The flowcharts shown in the accompanying drawings are merely examples for description, but do not necessarily include all content or operations/steps, and the operations/steps are not necessarily performed in the order described. For example, some operations/steps may alternatively be split, combined, or partially combined, and therefore an actual order of execution may change depending on an actual situation.

Figure 1:
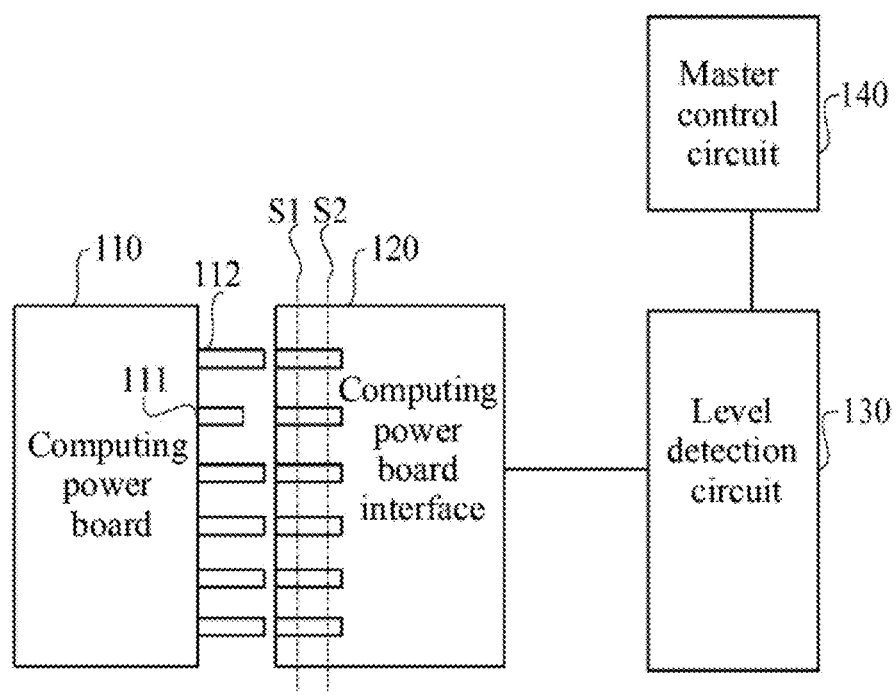
FIG. 1 is a schematic diagram of a circuit in an implementation of a supercomputing device according to an embodiment of the present application.

FIG. 1 is a schematic diagram of a circuit in an implementation of a supercomputing device.

As shown in FIG. 1, the supercomputing device includes at least one computing power board 110, a computing power board interface 120, a level detection circuit 130, and a master control circuit 140.

The computing power board 110 includes a first-type signal pin 111 and a second-type signal pin 112. The first-type signal pin 111 has a different length from that of the second-type signal pin 112.

For example, the length of the first-type signal pin 111 is less than that of the second-type signal pin 112. The first-type signal pin 111 is an in-place signal pin configured to implement in-place detection, and the second-type signal pin 112 is a reused signal pin capable of implementing level detection and data information transmission. The computing power board 110 further includes normal signal pins configured to implement predetermined functions other than in-place detection. The in-place signal pin is shorter than the normal signal pins, and the normal signal pins have a same length and include the second-type signal pin 112. By using the longer reused signal pin and the shorter in-place signal pin, in-place information of the computing power board 110 when being inserted or pulled out can be detected more accurately.

The computing power board 110 may be inserted into the computing power board interface 120, so as to implement connection between the computing power board 110 and the supercomputing device. There may be one or more computing power boards 110 configured to perform computation of hash functions.

In some implementations, the level detection circuit 130 is electrically connected to the computing power board interface 120, and the master control circuit 140 is connected to the level detection circuit 130. The level detection circuit 130 is configured to detect a first level signal corresponding to the first-type signal pin 111 and a second level signal corresponding to the second-type signal pin 112. The master control circuit 140 is configured to determine in-place information of the computing power board 110 based on the first level signal and the second level signal, where the in-place information includes an in-place state, an incompletely inserted state, and an out-of-place state.

Figure 2:
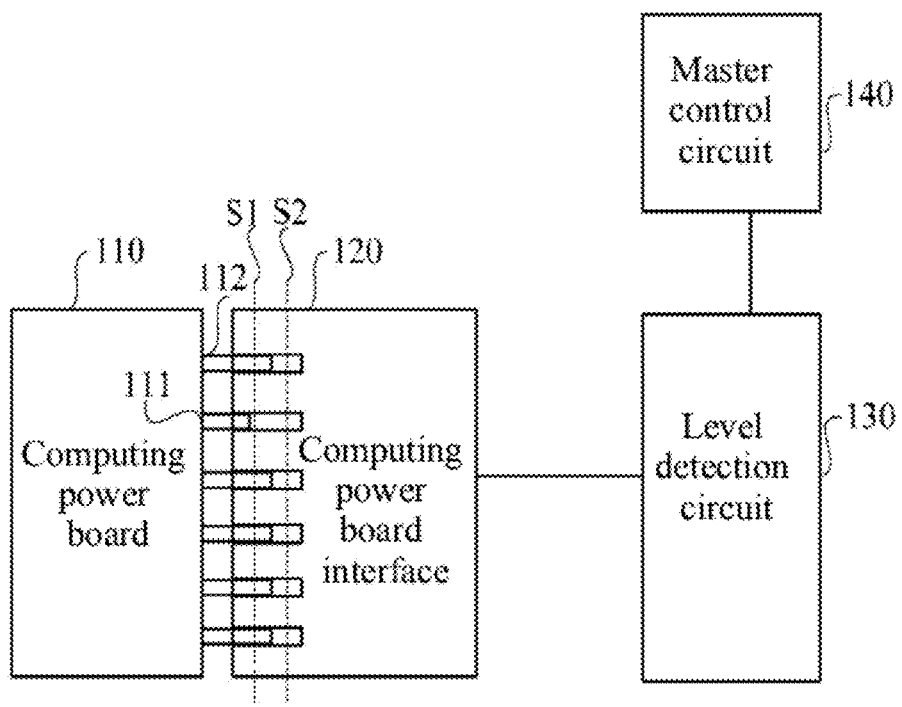
FIG. 2 is a schematic diagram of a circuit when a computing power board is in an incompletely inserted state according to an embodiment of the present application.
Figure 3:
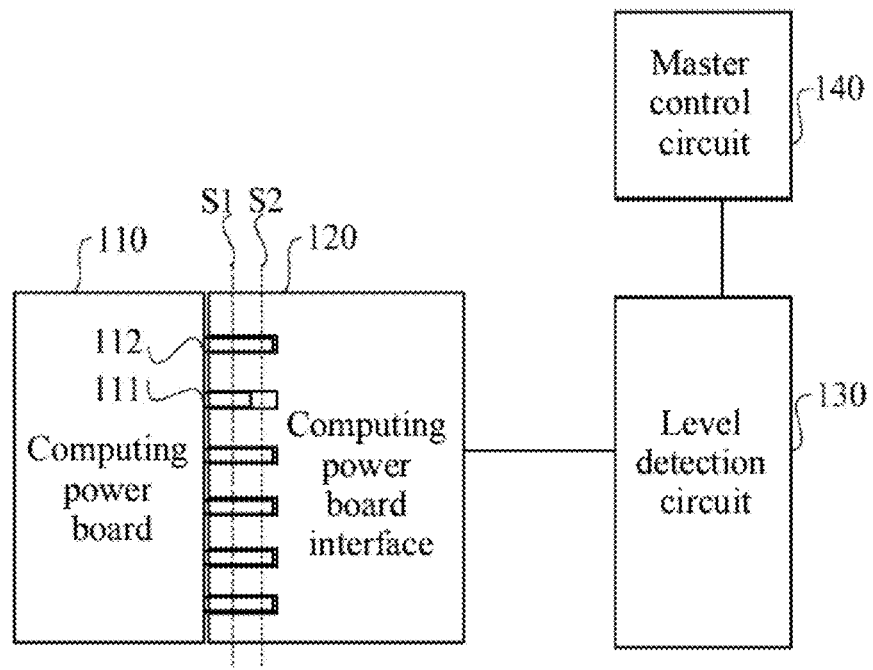
FIG. 3 is a schematic diagram of a circuit when a computing power board is in an in-place state according to an embodiment of the present application.

As shown in FIGS. 1 to 3, the length of the first-type signal pin 111 is less than that of the second-type signal pin 112. As shown in FIG. 1, the computing power board 110 is in the out-of-place state. The out-of-place state is a state in which the second-type signal pin 112 does not reach a first preset position S1 of the computing power board interface 120 and the first-type signal pin 111 does not reach the first preset position S1.

As shown in FIG. 2, the computing power board 110 is in the incompletely inserted state. The incompletely inserted state is a state in which the second-type signal pin 112 is located between the first preset position S1 and a second preset position S2 of the computing power board interface 120 and the first-type signal pin 111 does not reach the first preset position S1.

It should be noted that a current supercomputing device detects the in-place information of the computing power board 110 through the in-place signal pin (the first-type signal pin 111), and such a detection manner can only make it possible to determine that the in-place information of the computing power board 110 is the in-place state or the out-of-place state. To be specific, it is determined that the in-place information of the computing power board 110 is the out-of-place state when the first-type signal pin 111 does not reach the first preset position S1, and it is determined that the in-place information of the computing power board 110 is the in-place state when the first-type signal pin 111 reaches a position between the first preset position S1 and the second preset position S2. However, when the computing power board 110 is subjected to incomplete insertion due to failure to reach a specified position when inserted, a false determination of in-place information of the computing power board 110 is easily made, bringing about potential safety hazards.

In view of this, the in-place information of the computing power board 110 is determined, in this embodiment, based on the first level signal corresponding to the first-type signal pin 111 and the second level signal corresponding to the second-type signal pin 112. In this way, the in-place information of the computing power board can be accurately detected with a high reliability, and the use safety of electricity can be ensured.

As shown in FIG. 3, the computing power board 110 is in the in-place state. The in-place state is a state in which the second-type signal pin 112 reaches or goes beyond the second preset position S2 of the computing power board interface 120 and the first-type signal pin 111 reaches or goes beyond the first preset position S1.

For example, the first-type signal pin 111 includes a hot plug signal pin, for example, a hotswap signal pin. The second-type signal pin 112 includes a reused information pin. The reused information pin is configured to implement synchronous level signal detection and data information transmission. The reused information pin is, for example, an abs information pin. The abs information pin can implement synchronous transmission of level signals and abs function signals.

As shown in FIGS. 1 to 3, the level detection circuit 130 is configured to detect the first level signal corresponding to the first-type signal pin 111 and the second level signal corresponding to the second-type signal pin 112. The level detection circuit 130 is connected to the master control circuit 140 to transmit the detected first level signal corresponding to the first-type signal pin 111 and the detected second level signal corresponding to the second-type signal pin 112 to the master control circuit 140. The master control circuit 140 is configured to determine in-place information of the computing power board 110 based on the first level signal and the second level signal, where the in-place information includes an in-place state, an incompletely inserted state, and an out-of-place state.

For example, if both the first level signal and the second level signal are first preset signals, it is determined that the in-place information of the computing power board 110 is the out-of-place state: if the first level signal is a second preset signal and the second level signal is a first preset signal, it is determined that the in-place information of the computing power board 110 is the incompletely inserted state; and if both the first level signal and the second level signal are second preset signals, it is determined that the in-place information of the computing power board 110 is the in-place state. The in-place information of the computing power board 110 is determined based on the first level signal corresponding to the first-type signal pin 111 and the second level signal corresponding to the second-type signal pin 112. In this way, the in-place information of the computing power board can be accurately detected with a high reliability, and major faults can be prevented from occurring.

The first preset signal is a high level signal, and the second preset signal is a low level signal. Alternatively, the first preset signal is a low level signal, and the second preset signal is a high level signal. This is not specifically limited in this embodiment.

Figure 4:
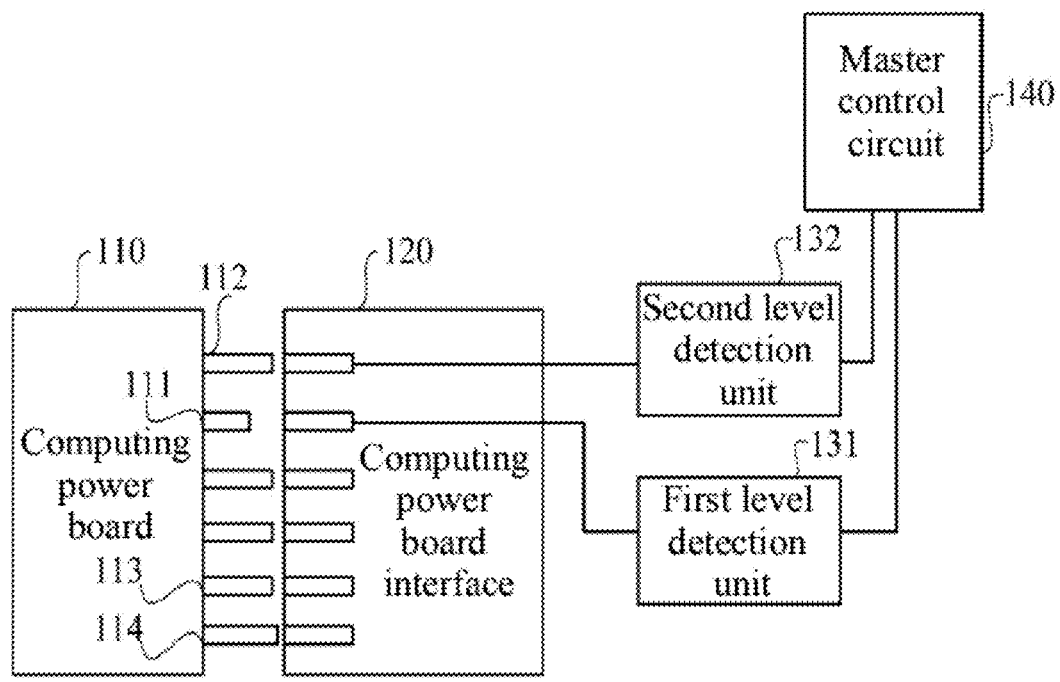
FIG. 4 is a schematic diagram of a circuit in another implementation of a supercomputing device according to an embodiment of the present application.

In some implementations, as shown in FIG. 4, the computing power board 110 further includes a power pin 113 and a ground pin 114. The power pin 113 has a length that is less than that of the ground pin 114, which ensures that when the computing power board 110 is inserted into the computing power board interface 120, the ground pin 114 is energized before the power pin 113, avoiding a short circuit in the computing power board 110 and thus ensuring the use safety of electricity.

As shown in FIG. 4, the level detection circuit 130 includes a first level detection unit 131 and a second level detection unit 132. The first level detection unit 131 is configured to detect the first level signal corresponding to the first-type signal pin 111, and the second level detection unit 132 is configured to detect the second level signal corresponding to the second-type signal pin 112. The first level detection unit 131 and the second level detection unit 132 are used to respectively detect the first level signal corresponding to the first-type signal pin 111 and the second level signal corresponding to the second-type signal pin 112, so that the first level detection unit 131 transmits the first level signal corresponding to the first-type signal pin 111 to the master control circuit 140, and the second level detection unit 132 transmits the second level signal corresponding to the second-type signal pin 112 to the master control circuit 140.

Figure 5:
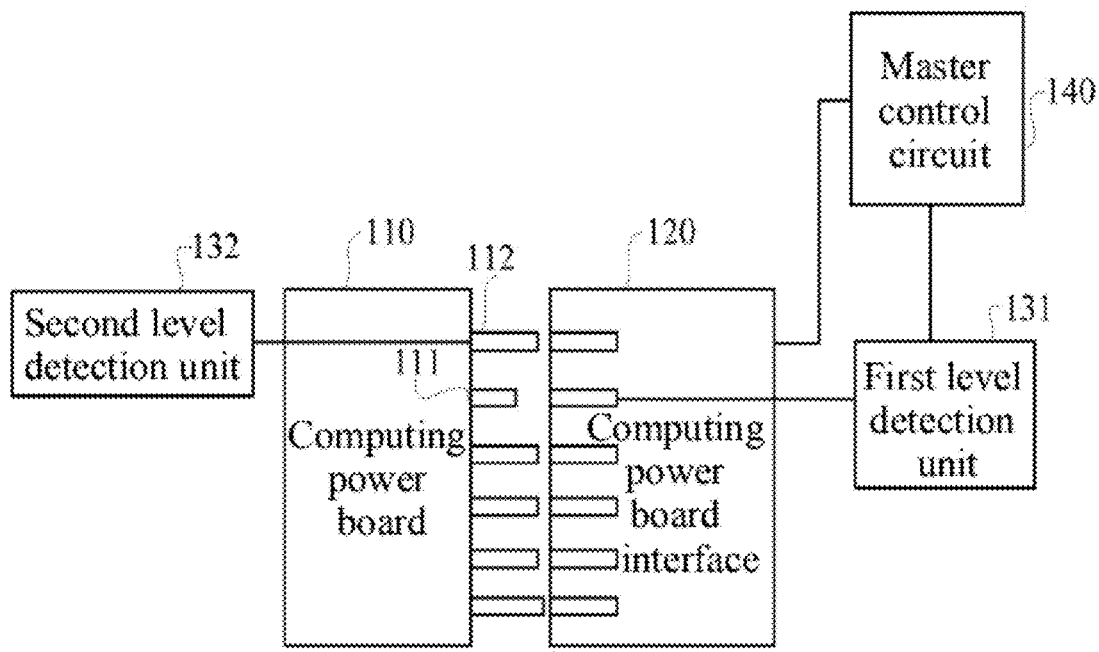
FIG. 5 is a schematic diagram of a circuit in another implementation of a supercomputing device according to an embodiment of the present application.

As shown in FIGS. 4 and 5, the first level detection unit 131 is arranged on a supercomputing device body and connected between the computing power board interface 120 and the master control circuit 140, and the second level detection unit 132 is arranged on the supercomputing device body or the computing power board 111.

The first level detection unit 131 is connected, at one end, to a first computing power board interface corresponding to the first-type signal pin 111, and is connected, at the other end, to the master control circuit 140. When the second level detection unit 132 is arranged on the supercomputing device body, the second level detection unit 132 is connected, at one end, to a second computing power board interface corresponding to the second-type signal pin 112, and is connected, at the other end, to the master control circuit 140.

It may be understood that when the second level detection unit 132 is arranged on the computing power board 111, the second-type signal pin 112 is a reused information pin. The reused information pin is configured to implement synchronous level signal detection and data information transmission. The second level detection unit 132 is connected to the second-type signal pin 112, such that the second-type signal pin 112 may transmit the second level signal corresponding to the second-type signal pin 112 to implement a data information transmission function of the reused information pin, and the second computing power board interface corresponding to the second-type signal pin 112 may output the second level signal to the master control circuit 140. With the reused information pin for transmission of the second level signal, no additional cost is required to provide two in-place signal pins for in-place detection of the computing power board 110, which ensures the accuracy of detecting the in-place information of the computing power board 110 while reducing costs.

It should be noted that other normal information pins capable of implementing data information transmission may also be used to transmit the second level signal corresponding to the second-type signal pin 112 that is detected by the second level detection unit 132. This is not specifically limited in this embodiment.

Figure 6:
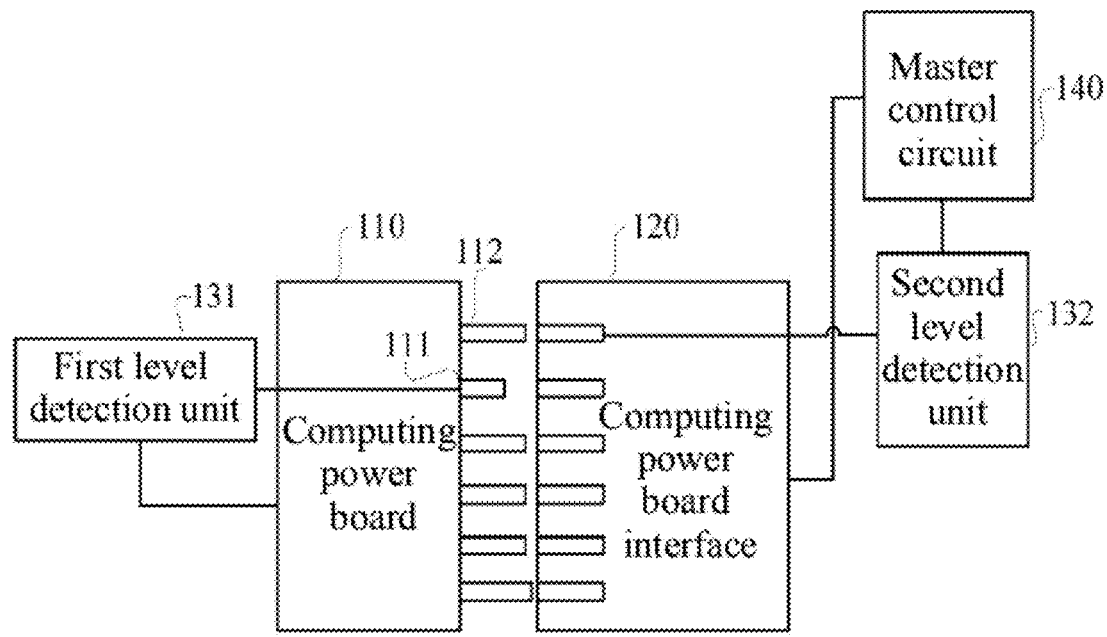
FIG. 6 is a schematic diagram of a circuit in another implementation of a supercomputing device according to an embodiment of the present application.

In another implementation, as shown in FIG. 6, the first level detection unit 131 is arranged on the computing power board, and the second level detection unit 132 is arranged on the supercomputing device body. The first level detection unit 131 is connected, at one end, to the first-type signal pin 111, and is connected, at the other end, to the computing power board 110, so that the first level signal corresponding to the first-type signal pin 111 that is detected by the first level detection unit 132 is transmitted by normal information pins capable of implementing data information transmission that include the second-type signal pin 112. The second level detection unit 132 is connected, at one end, to the second computing power board interface corresponding to the second-type signal pin 112, and is connected, at the other end, to the master control circuit 140. The second-type signal pin 112 is a reused information pin capable of implementing synchronous level signal detection and data information transmission. Therefore, the in-place information of the computing power board can be detected more accurately without increasing costs.

In another implementation, the first level detection unit 131 includes a first resistor, the first resistor being connected to a preset voltage. The preset voltage may be set flexibly. For example, the preset voltage is 3.3 V. The first resistor has the other side that is connected to the computing power board interface 120 and the master control circuit 140 and is used as a detection point of the first level signal. When the first-type signal pin 111 is inserted into a corresponding first computing power board interface, a circuit leading to the computing power board 110 is connected, and the first level signal corresponding to the first-type signal pin 111 is a low level signal; and when the first-type signal pin 111 is not inserted into the corresponding first computing power board interface, the circuit leading to the computing power board 110 is disconnected, and the first level signal corresponding to the first-type signal pin 111 is a high level signal.

In another implementation, the first level detection unit 131 includes a first resistor R10, the first resistor R10 being grounded, and the first-type signal pin 111 of the computing power board 110 is connected to a power supply. When the first-type signal pin 111 is inserted into a corresponding first computing power board interface, a circuit leading to the computing power board 110 is connected, and the first level signal corresponding to the first-type signal pin 111 is a high level signal; and when the first-type signal pin 111 is not inserted into the corresponding first computing power board interface, the circuit leading to the computing power board 110 is disconnected, and the first level signal corresponding to the first-type signal pin 111 is a low level signal.

In another implementation, the second level detection unit 132 includes a field-effect transistor and a second resistor. The field-effect transistor has a gate that is configured to receive a control signal, the control signal being used for controlling the field-effect transistor to be turned on or turned off; the field-effect transistor has a drain that is connected to a preset voltage through the second resistor and is used as a detection point of the second level signal, where the preset voltage may be set flexibly; and the field-effect transistor has a source that is grounded. The gate of the field-effect transistor may be connected to a second computing power board interface corresponding to the second-type signal pin 112, and the drain of the field-effect transistor may further be connected to the master control circuit 140, so that the master control circuit 140 detects the in-place information of the computing power board 110 through the second level detection unit 132.

Specifically; to improve the safety of the circuit, the gate of the field-effect transistor is connected to the second computing power board interface corresponding to the second-type signal pin 112 through a fourth resistor, and is connected to the source of the field-effect transistor through a third resistor. The control signal includes a first control signal and a second control signal. The first control signal is, for example, a high level signal for controlling the field-effect transistor to be turned on. The second control signal is, for example, a low level signal for controlling the field-effect transistor to be turned off.

Therefore, when an electrical channel between the second-type signal pin 112 and the corresponding second computing power board interface is connected, the control signal controls the field-effect transistor to be turned on, and the master control circuit 140 detects that there is a low level signal at the drain of the field-effect transistor; and when the electrical channel between the second-type signal pin 112 and the corresponding second computing power board interface is disconnected, the control signal controls the field-effect transistor to be turned off, and there is a high level signal at the drain of the field-effect transistor.

In another implementation, the drain of the field-effect transistor is grounded through the second resistor, and the second-type signal pin 112 of the computing power board 110 is connected to a power supply. The first control signal is a low level signal for controlling the field-effect transistor to be turned on. When the electrical channel between the second-type signal pin 112 and the corresponding second computing power board interface is disconnected, the low level signal controls the field-effect transistor to be turned on, and there is a low level signal at the drain of the field-effect transistor. The second control signal is, for example, a high level signal for controlling the field-effect transistor to be turned off. When the electrical channel between the second-type signal pin 112 and the corresponding second computing power board interface is connected, the high level signal controls the field-effect transistor to be turned off, and there is a high level signal at the drain of the field-effect transistor.

Figure 7:
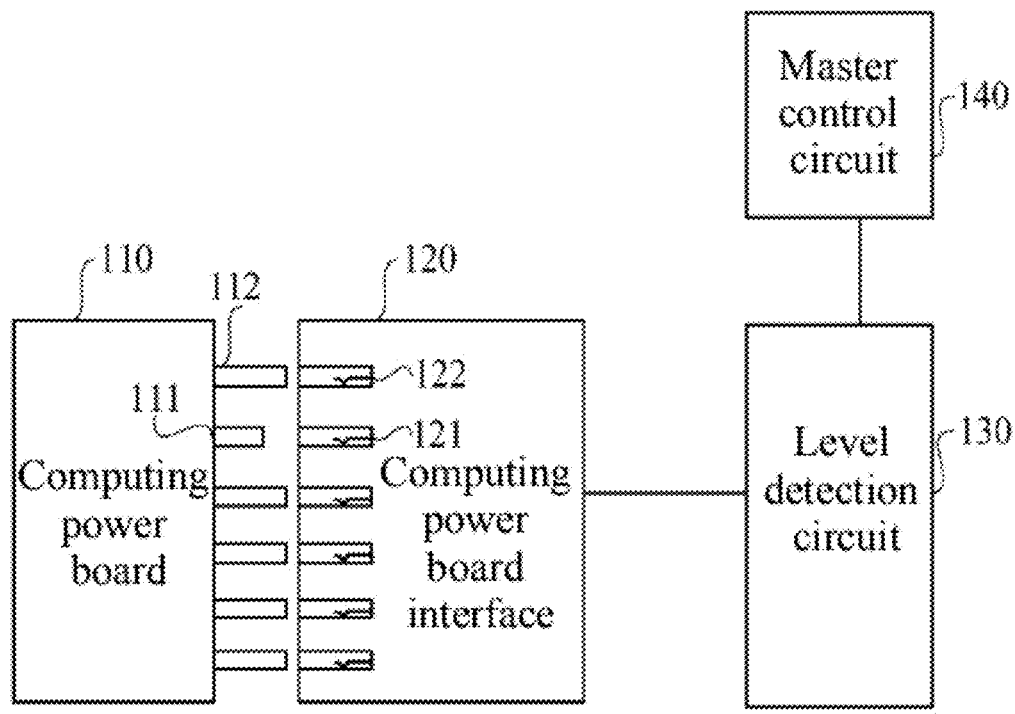
FIG. 7 is a schematic diagram of a circuit in another implementation of a supercomputing device according to an embodiment of the present application.

As shown in FIG. 7, the computing power board interface 120 includes a first spring piece 121 and a second spring piece 122. The first spring piece 121 is configured to be connected to the first-type signal pin 111, and the second spring piece 122 is configured to be connected to the second-type signal pin 112. Therefore, the first level signal corresponding to the first-type signal pin 111 is detected based on the first spring piece 121, and the second level signal corresponding to the second-type signal pin 112 is detected based on the second spring piece 122.

When the first spring piece 121 is not connected to the first-type signal pin 111, the level detection circuit 130 detects that the first level signal corresponding to the first-type signal pin 111 is a first preset signal; and when the first spring piece 121 is connected to the first-type signal pin 111, the level detection circuit 130 detects that the first level signal corresponding to the first-type signal pin 111 is a second preset signal.

When the second spring piece 122 is not connected to the second-type signal pin 112, the level detection circuit 130 detects that the second level signal corresponding to the second-type signal pin 112 is a first preset signal; and when the second spring piece 122 is connected to the second-type signal pin 112, the level detection circuit 130 detects that the second level signal corresponding to the second-type signal pin 112 is a second preset signal.

The first preset signal is a high level signal, and the second preset signal is a low level signal. Alternatively, the first preset signal is a low level signal, and the second preset signal is a high level signal. This is not specifically limited in this embodiment. If the first level signal is a second preset signal and the second level signal is a first preset signal, it is determined that the in-place information of the computing power board 110 is the incompletely inserted state. The detection reliability is higher.

In some implementations, the first spring piece 121 has a length that is greater than that of the second spring piece 122, so that when the computing power board 110 is inserted into the computing power board interface 120, the first spring piece 121 is connected to the first-type signal pin 111, and the second spring piece 122 is connected to the second-type signal pin 112. Therefore, the computing power board 110 is prevented from being in the incompletely inserted state, and the use safety of electricity is ensured.

In some implementations, the supercomputing device further includes an output apparatus connected to the master control circuit 140. The output apparatus is configured to output the in-place information of the computing power board 110.

In a possible implementation, the output apparatus includes at least one of an indicator light, a display screen, a buzzer, etc.

For example, as shown in FIG. 2, when the second-type signal pin 112 is located between the first preset position S1 and the second preset position S2 of the computing power board interface 120, and the first-type signal pin 111 does not reach the first preset position S1, the level detection circuit 130 detects that the first level signal corresponding to the first-type signal pin 111 is a second preset signal and the second level signal corresponding to the second-type signal pin 112 is a first preset signal, and the master control circuit 140 determines that the in-place information of the computing power board 110 is the incompletely inserted state, and may trigger the output apparatus to make a prompt that the computing power board 110 is in the incompletely inserted state. For example, the indicator light is triggered to flicker, the display screen is triggered to output an image prompt, and/or the buzzer is triggered to give a warning.

According to the supercomputing device provided in the embodiments of this specification, when the computing power board is inserted into the computing power board interface, the level detection circuit detects the first level signal corresponding to the first-type signal pin and the second level signal corresponding to the second-type signal pin, and the master control circuit determines the in-place information of the computing power board based on the first level signal and the second level signal, the in-place information including the in-place state, the incompletely inserted state, and the out-of-place state. The first-type signal pin has a different length from that of the second-type signal pin, allowing for more accurate detection of the in-place information of the computing power board, particularly detection of whether the computing power board is in the incompletely inserted state, with a high reliability, and thus preventing major faults from occurring due to incomplete insertion of the computing power board.

An embodiment of the present application further provides an in-place detection method for a computing power board. The in-place detection method may be applied to a computer device, such as a supercomputing device. Some implementations of the present application are described in detail below with reference to the accompanying drawings. The following embodiments and features in the embodiments may be mutually combined in case of no conflict.

Figure 8:
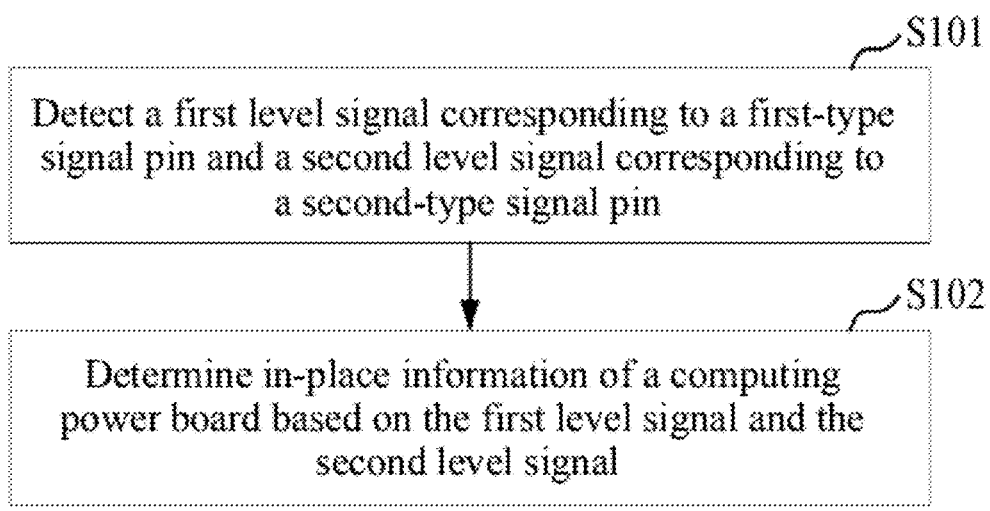
FIG. 8 is a schematic flowchart of an in-place detection method for a computing power board according to an embodiment of the present application.

Referring to FIG. 8, FIG. 8 is a schematic flowchart of an in-place detection method for a computing power board according to an embodiment of the present application.

As shown in FIG. 8, the in-place detection method includes steps S101 and S102.

In step S101, a first level signal corresponding to a first-type signal pin and a second level signal corresponding to a second-type signal pin are detected.

The supercomputing device includes at least one computing power board. The computing power board includes a first-type signal pin and a second-type signal pin, where the first-type signal pin has a different length from that of the second-type signal pin. For example, the length of the first-type signal pin is less than that of the second-type signal pin. The first-type signal pin is an in-place signal pin configured to implement in-place detection, and the second-type signal pin is a reused signal pin capable of implementing level detection and data information transmission.

The first-type signal pin includes a hot plug signal pin, for example, a hotswap signal pin. The second-type signal pin includes a reused information pin. The reused signal pin is configured to implement synchronous level signal detection and data information transmission. The reused information pin is, for example, an abs information pin. The abs information pin can implement synchronous transmission of level signals and abs function signals.

In some embodiments, the computing power board includes the in-place signal pin configured to implement in-place detection and an normal signal pin configured to implement predetermined functions other than in-place detection. The in-place signal pin is shorter than the normal signal pin, and the normal signal pin includes the reused signal pin capable of implementing level detection.

Figure 9:
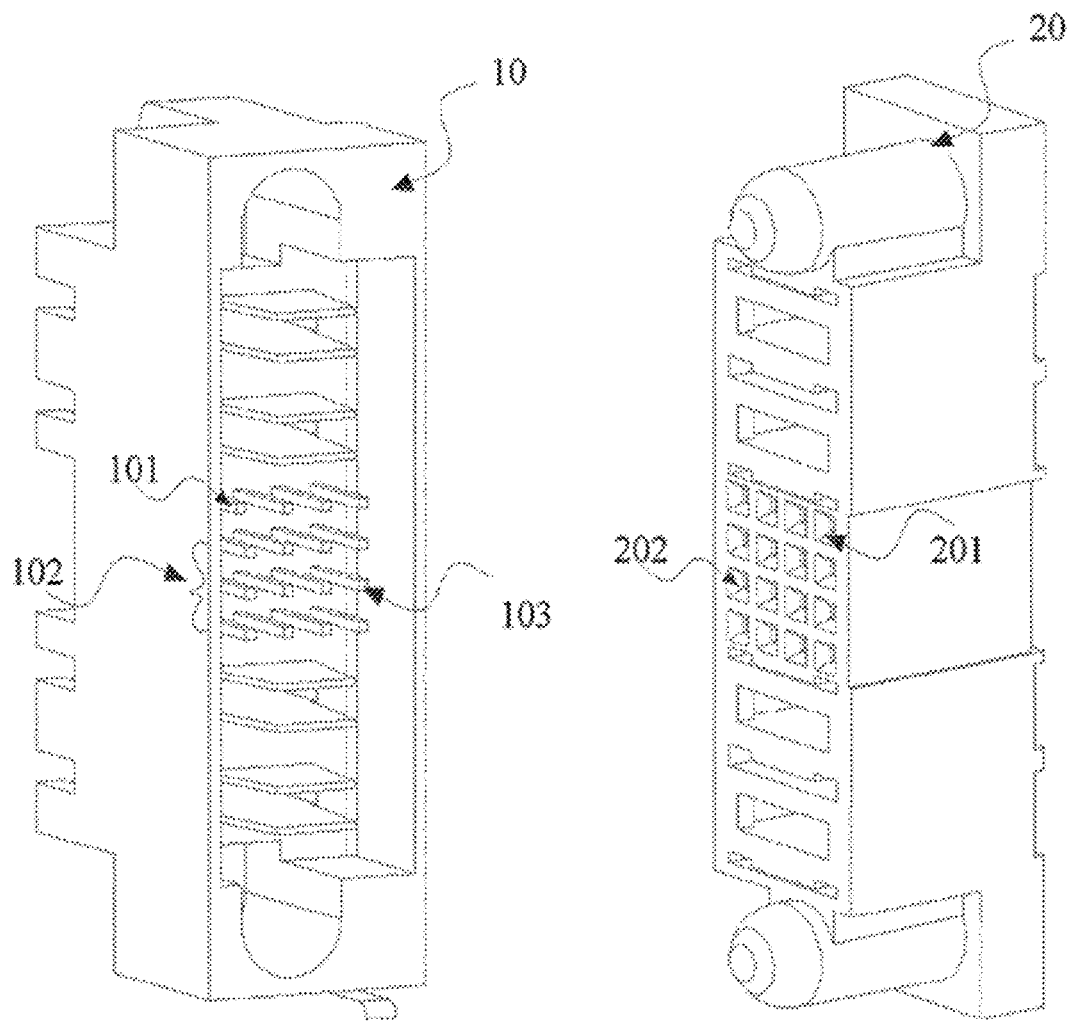
FIG. 9 is a schematic structural diagram of a computing power board and a computing power board interface according to an embodiment of the present application.

For example, as shown in FIG. 9, a computing power board 10 includes one in-place signal pin 101 (first-type signal pin) and a plurality of normal signal pins 102. The plurality of normal signal pins 102 include a reused signal pin 103 (second-type signal pin). The in-place signal pin 101 is configured for in-place detection of the computing power board. The normal signal pins 102 are configured to implement predetermined functions other than in-place detection. The reused signal pin 103 can implement level detection and a predetermined function other than in-place detection, such as a data information transmission function. The in-place signal pin 101 is shorter than the plurality of normal signal pins 102, and is certainly shorter than the reused signal pin 103. With the longer reused signal pin and the shorter in-place signal pin, in-place information of the computing power board when being inserted or pulled out can be detected more accurately.

In an embodiment, the supercomputing device further includes a computing power board interface. The computing power board interface includes a first spring piece and a second spring piece. The first spring piece is configured to be connected to the first-type signal pin, and the first level signal corresponding to the first-type signal pin is detected based on the first spring piece. The second spring piece is configured to be connected to the second-type signal pin, and the second level signal corresponding to the second-type signal pin is detected based on the second spring piece.

For example, as shown in FIG. 9, a computing power board interface 20 includes a first spring piece 201 and a second spring piece 202. The first spring piece 201 is configured to be connected to the first-type signal pin 101, and the second spring piece 202 is configured to be connected to the second-type signal pin 103, such that the first level signal and the second level signal are obtained accurately.

In an embodiment, detection of the first level signal for the first-type signal pin based on the first spring piece includes: if the first spring piece is not connected to the first-type signal pin, detecting that the first level signal corresponding to the first-type signal pin is a first preset signal; and if the first spring piece is connected to the first-type signal pin, detecting that the first level signal corresponding to the first-type signal pin is a second preset signal. This facilitates accurate determination of the first level signal corresponding to the first-type signal pin.

In an embodiment, detection of the second level signal for the second-type signal pin based on the second spring piece includes: if the second spring piece is not connected to the second-type signal pin, detecting that the second level signal corresponding to the second-type signal pin is a first preset signal; and if the second spring piece is connected to the second-type signal pin, detecting that the second level signal corresponding to the second-type signal pin is a second preset signal. This facilitates accurate determination of the second level signal corresponding to the second-type signal pin.

The first preset signal is a high level signal, and the second preset signal is a low level signal. Alternatively, the first preset signal is a low level signal, and the second preset signal is a high level signal. This is not specifically limited in this embodiment.

In an embodiment, the second spring piece is shorter than the first spring piece, so that when the computing power board is connected to the supercomputing device body through the computing power board interface, the first spring piece is connected to the first-type signal pin, and the second-type signal pin is connected to the second spring piece to detect that the second level signal corresponding to the second-type signal pin is a second preset signal. Therefore, the computing power board is prevented from being in the incompletely inserted state, and the use safety of electricity is ensured.

In step S102, in-place information of the computing power board is determined based on the first level signal and the second level signal.

The in-place information includes an in-place state, an incompletely inserted state, and an out-of-place state.

Specifically, if both the first level signal and the second level signal are first preset signals, it is determined that the in-place information of the computing power board is the out-of-place state: if the first level signal is a second preset signal and the second level signal is a first preset signal, it is determined that the in-place information of the computing power board is the incompletely inserted state; and if both the first level signal and the second level signal are second preset signals, it is determined that the in-place information of the computing power board is the in-place state.

For example, the first preset signal is a high level signal, and the second preset signal is a low level signal. Alternatively, the first preset signal is a low level signal, and the second preset signal is a high level signal. This is not specifically limited in this embodiment.

In an embodiment, the length of the first-type signal pin is less than that of the second-type signal pin, and the out-of-place state is a state in which the second-type signal pin does not reach a first preset position of the computing power board interface and the first-type signal pin does not reach the first preset position: the incompletely inserted state is a state in which the second-type signal pin 112 is located between the first preset position and a second preset position of the computing power board interface and the first-type signal pin does not reach the first preset position; and the in-place state is a state in which the second-type signal pin reaches or goes beyond the second preset position of the computing power board interface and the first-type signal pin reaches or goes beyond the first preset position.

It should be noted that the in-place information of the computing power board is determined, in this embodiment, based on the first level signal corresponding to the first-type signal pin and the second level signal corresponding to the second-type signal pin. In this way, the in-place information of the computing power board can be accurately detected with a high reliability, and the use safety of electricity can be ensured.

In an embodiment, after in-place information of the computing power board is determined based on the first level signal and the second level signal, the method further includes: if the in-place information of the computing power board indicates incomplete insertion, outputting prompt information indicating that the computing power board is incompletely inserted. For example, if the supercomputing device detects that the first level signal corresponding to the first-type signal pin is a second preset signal and the second level signal corresponding to the second-type signal pin is a first preset signal, it is determined that the in-place information of the computing power board is the incompletely inserted state, and an output apparatus may be triggered to make a prompt that the computing power board is in the incompletely inserted state. For example, the indicator light is triggered to flicker, the display screen is triggered to output an image prompt, and/or the buzzer is triggered to give a warning, preventing major faults from occurring due to incomplete insertion of the computing power board.

In the in-place detection method provided in the foregoing embodiment, the first level signal corresponding to the first-type signal pin and the second level signal corresponding to the second-type signal pin are detected, and the in-place information of the computing power board is determined based on level statuses of the first level signal and the second level signal, the in-place information including the in-place state, the incompletely inserted state, and the out-of-place state. This method allows for more accurate detection of the in-place information of the computing power board, particularly detection of whether the computing power board is in the incompletely inserted state, thereby preventing major faults from occurring due to incomplete insertion of the computing power board when failing to reach a specified position during insertion.

An embodiment of the present application further provides a computer-readable storage medium having a computer program stored thereon, where when the computer program is executed by a processor, the following steps are implemented:

detecting a first level signal corresponding to a first-type signal pin and a second level signal corresponding to a second-type signal pin; and determining in-place information of the computing power board based on the first level signal and the second level signal, where the in-place information includes an in-place state, an incompletely inserted state, and an out-of-place state.

It should be noted that a person skilled in the art can clearly know that for ease and brevity of description, for a specific working process of the foregoing computer-readable storage medium, reference may be made to each embodiment of the in-place detection method for a computing power board in the present application.

The computer-readable storage medium may be an internal storage unit of the supercomputing device in the foregoing embodiment, such as a hard disk or an internal memory of the supercomputing device. Alternatively, the computer-readable storage medium may be an external storage device of the supercomputing device, such as a plug-in hard disk, a smart media card (SMC), a secure digital (SD) card, or a flash card on the supercomputing device.

It should be understood that terms used in this specification of the present application are only for the purpose of describing specific embodiments, and are not intended to limit the present application. As used in this specification and the appended claims of the present application, the singular forms "a", "an", and "the" are intended to include plural forms, unless otherwise explicitly specified in the context.

It should be understood that the term "and/or" used in this specification and the appended claims of the present application indicates any combination and all possible combinations of one or more items listed in association, and includes the combinations. It should be noted that the term "comprise", "include", or any other variant thereof herein is intended to encompass a non-exclusive inclusion, such that a process, method, article, or system that includes a series of elements not only includes those elements, but also includes other elements not explicitly listed, or elements that are inherent to such a process, method, article, or system. In the absence of more restrictions, an element defined by "including a . . . " does not exclude another same element in a process, method, article, or system that includes the element.

The serial numbers of the foregoing embodiments of the present application are only for description, and do not represent the superiority or inferiority of the embodiments. The foregoing descriptions are merely specific implementations of the present application, but are not intended to limit the protection scope of the present application. Any equivalent modification or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A supercomputing device, comprising:
   at least one computing power board, the computing power board comprising a first-type signal pin and a second-type signal pin, wherein the first-type signal pin has a different length from that of the second-type signal pin;
   a computing power board interface, the computing power board being inserted into the computing power board interface;
   a level detection circuit, the level detection circuit being electrically connected to the computing power board interface; and
   a master control circuit, the master control circuit being connected to the level detection circuit,
   wherein the level detection circuit is configured to detect a first level signal corresponding to the first-type signal pin and a second level signal corresponding to the second-type signal pin, and the master control circuit determines in-place information of the computing power board based on the first level signal and the second level signal.

2. The supercomputing device according to claim 1, wherein the length of the first-type signal pin is less than that of the second-type signal pin, and the in-place information comprises an in-place state, an incompletely inserted state, and an out-of-place state;
   the incompletely inserted state is a state in which the second-type signal pin is located between a first preset position and a second preset position of the computing power board interface and the first-type signal pin does not reach the first preset position;
   the in-place state is a state in which the second-type signal pin reaches the second preset position of the computing power board interface and the first-type signal pin reaches the first preset position; and
   the out-of-place state is a state in which the second-type signal pin does not reach the first preset position of the computing power board interface and the first-type signal pin does not reach the first preset position.

3. The supercomputing device according to claim 2, wherein the first-type signal pin comprises a hot plug signal pin, and the second-type signal pin comprises a reused information pin, the reused information pin being configured to implement synchronous level signal detection and data information transmission.

4. The supercomputing device according to claim 1, wherein the level detection circuit comprises a first level detection unit and a second level detection unit, the first level detection unit being configured to detect the first level signal corresponding to the first-type signal pin, and the second level detection unit being configured to detect the second level signal corresponding to the second-type signal pin.

5. The supercomputing device according to claim 4, wherein the first level detection unit is arranged on a supercomputing device body, and the second level detection unit is arranged on the supercomputing device body or the computing power board; or the first level detection unit is arranged on the computing power board, and the second level detection unit is arranged on the supercomputing device body.

6. The supercomputing device according to claim 4, wherein the first level detection unit comprises a first resistor, the first resistor being connected to a preset voltage or being grounded.

7. The supercomputing device according to claim 4, wherein the second level detection unit comprises a field-effect transistor and a second resistor, the field-effect transistor having a gate that is configured to receive a control signal, the control signal being used for controlling the field-effect transistor to be turned on or turned off, the field-effect transistor having a drain that is connected to a preset voltage through the second resistor and is used as a detection point of the second level signal, and the field-effect transistor having a source that is grounded.

8. An in-place detection method for a computing power board, wherein the method is applied to a supercomputing device according to claim 1, the method comprising:
   detecting a first level signal corresponding to a first-type signal pin and a second level signal corresponding to a second-type signal pin; and
   determining in-place information of the computing power board based on the first level signal and the second level signal, wherein the in-place information comprises an in-place state, an incompletely inserted state, and an out-of-place state.

9. The in-place detection method according to claim 8, wherein the determining in-place information of the computing power board based on the first level signal and the second level signal comprises:
   if both the first level signal and the second level signal are first preset signals, determining that the in-place information of the computing power board is the out-of-place state;
   if the first level signal is a second preset signal and the second level signal is a first preset signal, determining that the in-place information of the computing power board is the incompletely inserted state; and
   if both the first level signal and the second level signal are second preset signals, determining that the in-place information of the computing power board is the in-place state.

10. A non-transitory computer-readable storage medium having a computer program stored thereon, wherein when the computer program is executed by a processor, the steps of the in-place detection method according to claim 8 are implemented.

* * * * *